No. 659,665. Patented Oct. 16, 1900.
C. R. GREUTER.
BRAKE FOR VEHICLES.
(Application filed Feb. 15, 1900.)
(No Model.)
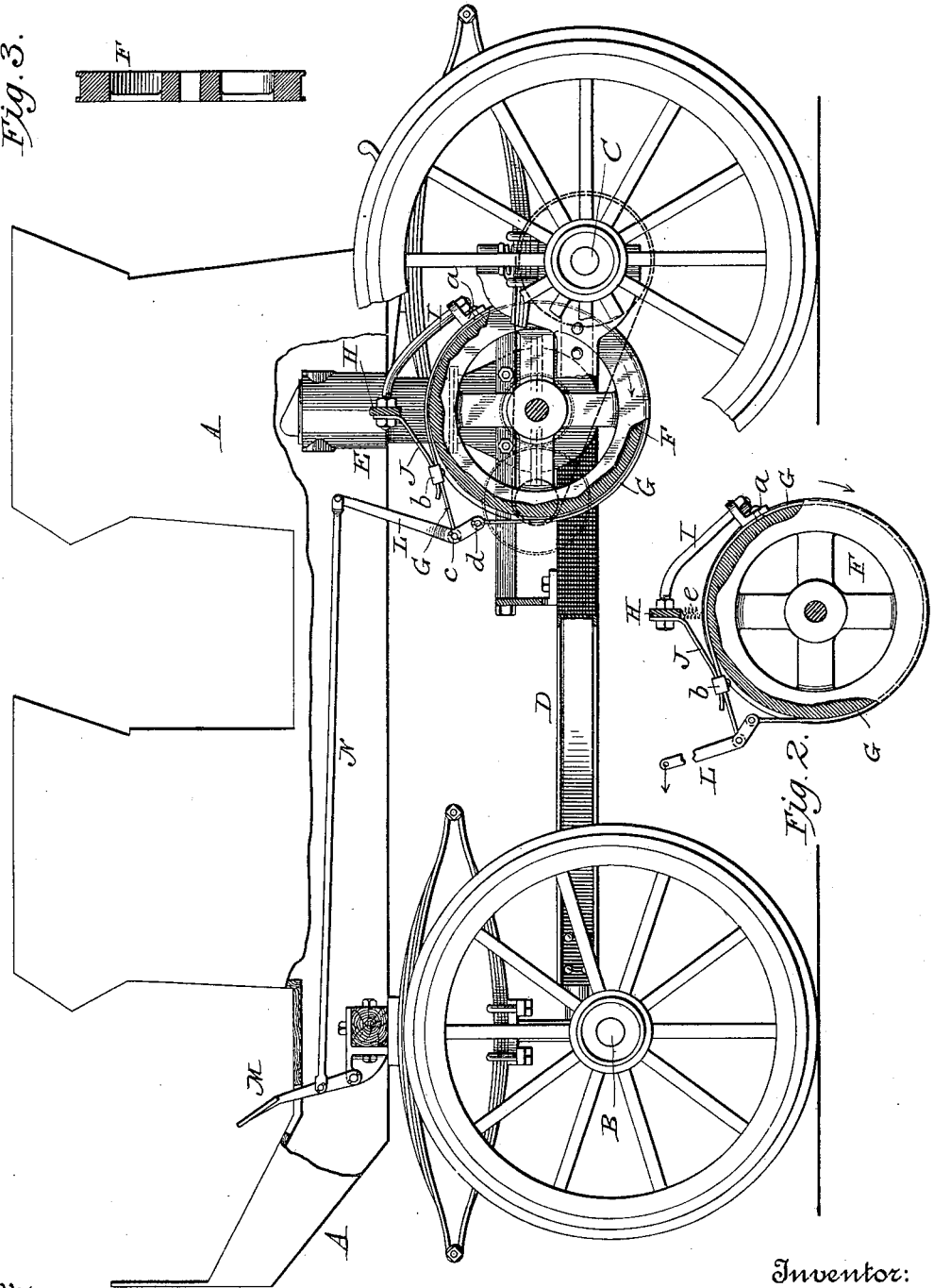
Witnesses
D. E. Purdine
J. B. Malnati
Inventor:
Charles R. Greuter,
by Dodge and Sons,
Attorneys.
THE NORRIS PETERS CO., PHOTO-LITHO., WASHINGTON, D. C.

United States Patent Office.

CHARLES R. GREUTER, OF HOLYOKE, MASSACHUSETTS, ASSIGNOR TO THE HOLYOKE AUTOMOBILE COMPANY, OF JERSEY CITY, NEW JERSEY.

BRAKE FOR VEHICLES.

SPECIFICATION forming part of Letters Patent No. 659,665, dated October 16, 1900.

Application filed February 15, 1900. Serial No. 5,359. (No model.)

*To all whom it may concern:*

Be it known that I, CHARLES R. GREUTER, a citizen of the United States, residing at Holyoke, in the county of Hampden and State of Massachusetts, have invented certain new and useful Improvements in Brakes for Vehicles, of which the following is a specification.

My present invention has reference to brakes for vehicles, and is designed more particularly for use in connection with that class of road-vehicles commonly designated as "automobiles."

By the term "automobile" is here meant a passenger-vehicle or a road-wagon for general use, designed for ordinary roadways and containing its own motor or means of propulsion; but the brake may be used in other relations, if desired. Being specially designed for the class of vehicles noted, it is represented in connection with an automobile such as I am now constructing for the trade.

In the drawings, Figure 1 is a side elevation of such a vehicle partially broken away to show my improved brake mechanism; Fig. 2, a detached view of the brake mechanism and the wheel to which it is applied, the latter being partially in section; and Fig. 3 a transverse sectional view of said wheel.

A in said drawings indicates the body of the vehicle, provided with axles B and C, connected by a perch or frame D, upon which latter is mounted the engine or motor E. As here represented, the motor is supported wholly independent of the body A of the vehicle, which latter is carried by springs mounted directly upon the axles; but the mounting of the engine and the body are matters not involved in the present case and need not, therefore, be more fully described herein.

The motor is provided with a comparatively large and heavy fly-wheel F, as is usual in engines or motors of this class, and it is to this wheel that the brake is preferably applied.

The brake consists, essentially, of a strap or band G, which may be of mild steel, phosphor-bronze, or other suitable metal or alloy, suspended from a bar or bracket H, projecting from the engine frame or shell by a rod I and an elastic or yielding arm J, a spring clip or bracket *a* being riveted or otherwise made fast to the strap or band G at the point of its attachment to the rod I and said rod passing through said clip or bracket, as shown in Figs. 1 and 2. The connection between the arm J and the strap or band G is a loose or sliding connection formed by a loop *b*, riveted to the band G and passing loosely about the free end of the arm J, so that as the arm and the band rise and fall there may be a limited independent movement. The two ends of the band or strap G are carried forward of the wheel F, which in the present showing is supposed to rotate in the direction of the arrow and are attached, respectively, to the lower end and to a point slightly above the lower end of a lever L, which is preferably made in the form of an elbow-lever, as shown in Figs. 1 and 2.

The upper end of the strap or band G constitutes a support for the lever L, which is pin-jointed or otherwise pivotally connected to the ends of said strap or band. This may conveniently be done by bifurcating the lower end of the lever, forming the strap or band G with an eye at each end, and passing through the eyes and through holes in the lever J pivot pins or bolts *c* and *d*, as indicated in Figs. 1 and 2. Under this construction the natural resilience of the band or strap G and its tendency to straighten out will cause the upper end thereof to rise out of contact with the upper side of wheel F, being assisted so to do and to overcome and sustain the weight of the lever L and of an actuating or connecting rod attached thereto by the spring-arm J or, if need be, by a spiral spring *e*. (Indicated in Fig. 2.)

From the clip *a* downward the band or strap G tends to spring away from the circumference of wheel F and by drawing down the lower extremity of lever L to throw backward its upper end to the position indicated in Fig. 1. In this way the brake is normally held off and the band or strap G is kept out of contact with the wheel F, leaving the same free to rotate without retardation and without wearing the strap or band.

M indicates a treadle or foot-lever pivoted to a sill or timber of the vehicle and having its free end extended upward to a convenient position to be reached by the foot of the steersman or an occupant of the vehicle. This lever M is connected by a rod N with the upper or free end of the lever L, so that when the treadle or foot-lever M is pushed forward or downward it shall through the rod N draw forward the upper end of the lever L, rocking said lever upon its pivot-pin $c$ and raising the pivot-pin $d$, and consequently tightening the band or strap G about the wheel F.

It will be seen that a comparatively-slight movement of the lever in one or the other direction serves to apply or to withdraw the brake, that being supported primarily from a bracket H projecting from the frame or shell of the engine there is no change in the relative position of the brake and the wheel to be clamped by reason of any movement of the engine or of the body of the vehicle, and that the supports for the brake are light and simple, though by reason of their arrangement they are adequate to the support of the brake.

As shown in the several figures, the wheel F is circumferentially channeled or grooved to receive the band or strap G and prevent its lateral displacement. This is deemed an advisable precaution, though it is not essential.

I am of course aware that strap or band brakes are old and that they have been made in a variety of forms; but the construction herein set forth is specially designed and is particularly adapted for use in connection with vehicles of the class set forth.

It will of course be understood that the wheel F may be any wheel or hub and that the fly-wheel of the engine is here taken merely for purposes of illustration or as a type.

Having thus described my invention, what I claim is—

1. In combination with a wheel or hub, and the frame in or by which it is supported; a bracket or support also carried by said frame; a flexible strap or band suspended from said support and passing about said wheel or hub; and a lever having said strap or band pivotally connected with it at different points in its length and supported by said band, whereby the strap or band is made to serve both as a brake and as a support for the actuating-lever.

2. In combination with a wheel or hub F, a band or strap G passing about the same; a bracket or support H; a rod I extending downward from said support in the general direction of rotation of the wheel or hub; a clip or connection uniting the brake band or strap and said rod; and a lever having one extremity attached to one end of the strap or band, and pivoted at another point in its length to the other end of said strap or band, substantially as shown and described.

3. In combination with wheel or hub F, flexible strap or band G passing about the same; a stationary bracket or support H; rod I and arm J extending downward from said bracket; clip $a$ connecting the strap or band with the rod I; loop $b$ forming a loose connection between the strap or band G and the arm J; and lever L pin-jointed or pivotally connected to the ends of the strap or band G by pins or bolts, $c$, $d$.

4. The herein-described brake for vehicles, comprising a hub or wheel F; a band or strap G passing about said wheel; supports H, I, J, for said band; a lever L connected with the ends of said band by pins or bolts $c$, $d$; a second lever M; and a rod N connecting the levers L and M, substantially as and for the purpose set forth.

In witness whereof I hereunto set my hand in the presence of two witnesses.

CHARLES R. GREUTER.

Witnesses:
ANDREW H. MATHESON,
ARTHUR E. PHELON.